United States Patent
Zernickel

(10) Patent No.: US 6,264,011 B1
(45) Date of Patent: Jul. 24, 2001

(54) DEVICE FOR ACTUATING A VEHICLE BRAKE

(75) Inventor: Alexander Zernickel, Herzogenaurach (DE)

(73) Assignee: INA Walzlager Schaeffler oHG (DE)

(*) Notice: Subject to any disclaimer, the term of this patent is extended or adjusted under 35 U.S.C. 154(b) by 0 days.

(21) Appl. No.: 09/431,908

(22) Filed: Nov. 2, 1999

(30) Foreign Application Priority Data

Nov. 5, 1998 (DE) .................................. 198 50 923

(51) Int. Cl.[7] .................... F16D 55/224; F16D 65/16; F16D 65/18; F16D 65/21
(52) U.S. Cl. .................... 188/72.8; 188/71.9; 188/72.1; 188/196 V; 188/156
(58) Field of Search ............... 188/72.8, 72.1, 188/156, 158, 202, 71.8, 71.9, 157, 72.7, 71.2, 196 V, 196 B, 196 BA, 196 R, 196 C, 162; 74/424.8 C, 458

(56) References Cited

U.S. PATENT DOCUMENTS

| | | |
|---|---|---|
| 3,081,644 | 3/1963 | Hudgens et al. . |
| 3,404,755 * | 10/1968 | Keatley et al. . |
| 4,278,152 | 7/1981 | Tosi . |
| 5,107,967 * | 4/1992 | Fujita et al. ............... 188/72.1 |

FOREIGN PATENT DOCUMENTS

| | | |
|---|---|---|
| 1530617 | 12/1969 | (DE) . |
| 3106011 | 1/1982 | (DE) . |
| 4418701 | 11/1995 | (DE) . |
| 196 21 533 | 12/1997 | (DE) . |
| 197 05 106 | 8/1998 | (DE) . |
| 19853721 * | 6/1999 | (DE) . |

* cited by examiner

*Primary Examiner*—Douglas C. Butler
(74) *Attorney, Agent, or Firm*—Bierman, Muserlian and Lucas

(57) ABSTRACT

A device for actuating a vehicle brake, which device comprises a threaded spindle (1) which is secured against rotation in a stationary housing (4) while being axially displaceable toward and away from a brake disc (6) of the vehicle brake, and further comprises a nut (2) which surrounds the threaded spindle (1) and effects a displacement thereof, the nut (2) having a longitudinal axis and being mounted for rotation about this longitudinal axis in the stationary housing (4) while being connected to the rotor of a drive motor (9), comprises, according to the invention, a motion-transmitting ramp unit (10) equipped with rolling elements and arranged between the nut (2) and the drive motor (9).

8 Claims, 2 Drawing Sheets

DEVICE FOR ACTUATING A VEHICLE BRAKE

FIELD OF THE INVENTION

The invention concerns a device for actuating a vehicle brake, said device comprising a threaded spindle which is secured against rotation in a stationary housing while being axially displaceable toward and away from a brake disc of the vehicle brake, the device further comprising a nut which surrounds the threaded spindle and effects a displacement thereof, said nut having a longitudinal axis and being mounted for rotation about this longitudinal axis in the stationary housing while being connected to a rotor of a drive motor.

BACKGROUND OF THE INVENTION

Devices of the predated type serve to convert a rotary motion into a translational motion. They are suitable for use in fields where only a limited stroke of the threaded spindle is required e.g., in an actuator of an electromechanical brake or in an electrically operated parking brake of a vehicle.

In such a device known from the published application DE 197 05 106 A1, two ball screw drives are combined with each other, namely, an inner screw drive made up of the spindle, the nut and inner rolling elements, and an outer screw drive made up of the nut, an additional nut surrounding this nut and outer rolling elements. By the cooperation of the two screw drives a desired, small total pitch is obtained as the difference between the individual pitches of the two screw drives. This enables the use of standard threads to achieve a very small resultant pitch of the brake device. Such a combination of ball screw drives, however, has the drawback of an expensive structural configuration and increased design space requirement.

OBJECTS OF THE INVENTION

It is therefore an object of the invention to provide an economically manufacturable actuating device which at the same time has a small space requirement and is highly efficient.

This and other objects and advantages of the invention will become obvious from the following detailed description.

SUMMARY OF THE INVENTION

The invention achieves the above objects by the fact that a motion-transmitting ramp unit equipped with rolling elements is arranged between the nut and the drive motor. The concept of the invention is based on the reasoning that low-friction rolling motion should be used only where it is really needed. As shown in FIG. 3 of the drawings, the stroke S of the threaded spindle can be divided into the following stages:

$S_1$=overcoming the clearance between the brake linings and the brake disc, $S_2$=pressure build-up with a low force (5 to 10 % of the maximum load), $S_3$=pressure build-up with a high force. FIG. 3 shows the force F. measured in kilonewtons, acting between the threaded spindle and the brake disc, as a function of the stroke S measured in millimeters. This allows the confusion that a cheap sliding spindle, that is to say a spindle that does not require rolling elements, can be used for the stages $S_1$ and $S_2$ which make up approximately 50 % of the total stroke. It is only during the stage S3 that the ramp unit comes into action inasmuch as the rolling elements then roll on the ramps.

The invention thus provides a combined sliding and rolling spindle assembly which is comprised of two simple elements, viz., a sliding spindle which may have, for example, a trapezoid thread, and a ramp unit equipped with rolling elements. The combination of these two elements enables the realization of an economic spindle assembly having a high degree of efficiency and a small space requirement.

The ramp unit comprises a set of rolling elements surrounding the threaded spindle and arranged axially between two flange bodies each of which comprises ramps and depressions. One of these flange bodies is configured as a nut flange fixed on the nut and the other flange body is configured as a drive flange formed on a drive sleeve which is connected to the rotor of the motor.

The nut flange can be urged axially toward the rolling element set and the drive flange within the stationary housing by a compression spring which may be configured as a disc spring having one end supported on a step of the housing and another end supported on a bearing ring of a thrust rolling bearing for the nut flange.

Besides this, a bearing ring of a thrust rolling bearing for the drive flange can be supported within the stationary housing on an end rim thereof.

The rotating and sliding motion of the nut in the stationary housing can be achieved by mounting the nut through a linear ball bearing.

Examples of embodiment of the invention are represented in the drawings and will be described more closely in the following.

DETAILED DESCRIPTION OF THE DRAWINGS

Figure 1:
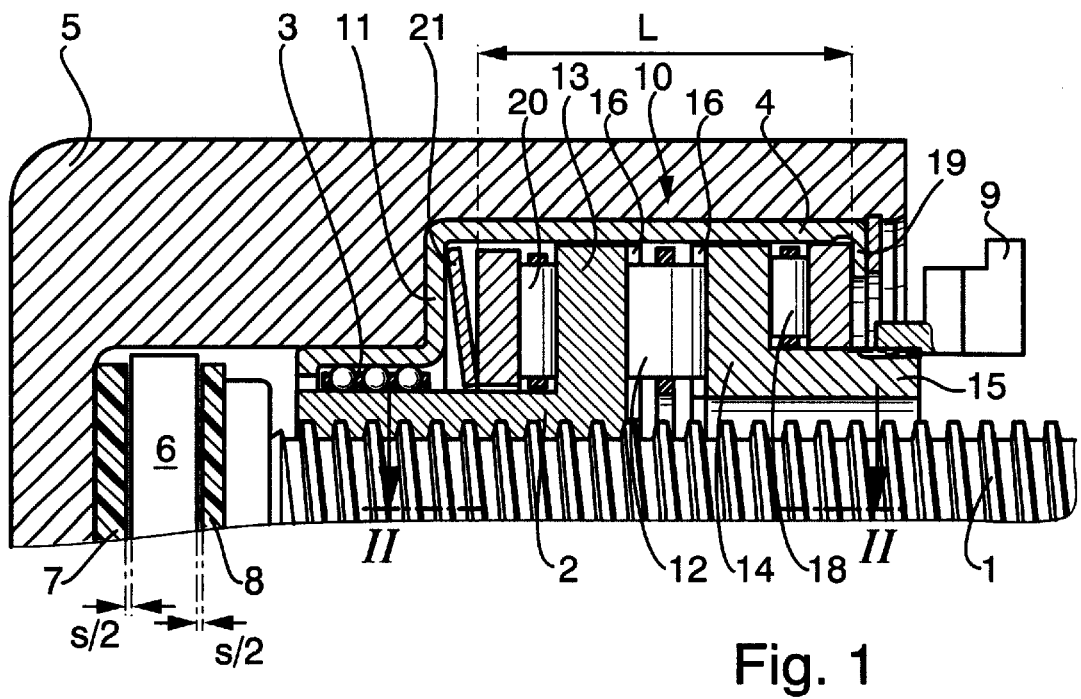
FIG. 1 is a partial section through a brake device having thrust rolling bearings, wherein the rolling elements are rollers.

An actuating device of the invention represented in FIG. 1 comprises a threaded spindle 1 which is surrounded by a nut 2. This nut 2 is rotatably and slidably supported in a stationary housing 4 by a linear ball bearing 3. The stationary housing 4 is held in a caliper 5 of a vehicle brake which has a brake disc 6 and two brake linings 7 and 8 that act on the brake disc 6 when the threaded spindle 1 is moved axially towards the brake disc 6. One of the brake linings 7 is disposed between the caliper 5 and the brake disc 6, while the other brake lining 8 is disposed between the brake disc 6 and the threaded spindle 1. The threaded spindle 1, while being axially displaceable in the stationary housing 4, is secured against rotation. The stroke which the spindle 1 executes during a braking operation is indicated on either side of the brake disc 6 by the length S/2 which in FIG. 1 is the distance of the brake disc 6 from each brake lining. To move the threaded spindle 1 in axial direction, the nut 2 is caused to rotate by the rotor of a drive motor 9. The transmission of this motion is effected by a ramp unit 10 which comprises in a portion of the stationary housing 4 enlarged by a housing step 11, a set of rolling elements 12 which surrounds the threaded spindle 1 and is arranged between two flange bodies. One of these flange bodies is a nut flange 13 which is arranged on an axial end of the nut 2 and formed integrally thereon, while the other flange body is a drive flange 14 which is made in one piece with a drive sleeve 15. On its outer peripheral surface, the drive sleeve 15 comprises a gear which meshes with a pinion of the rotor of the drive motor 9. Each of the nut flange 13 and the drive flange 14 comprises a ramp 16 and a depression 17 for the rolling elements of the rolling element set 12.

The drive flange 14 is supported through its surface remote from the rolling element set 12 on a thrust rolling bearing 18 in the stationary housing 4. The bearing ring on which the other raceway of the thrust rolling bearing 18 is formed is supported on a rim 19 of the stationary housing 4.

On the surface of the nut flange 13 remote from the rolling element set 12, there is likewise arranged a thrust rolling bearing 20 whose bearing ring comprising the other raceway is urged axially toward the rolling element set 12 by a compression spring 21 which is supported on the housing step 11. This compression spring 21 is configured as a disc spring. The rolling elements of the rolling element set 12 and the thrust rolling bearings 18 and 20 are rollers.

Figure 2:
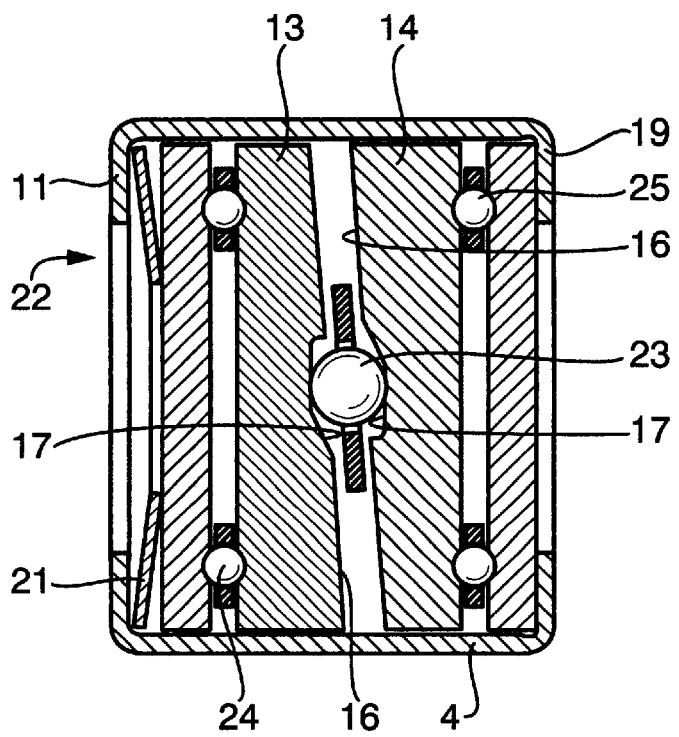
FIG. 2 is a partial section along line ll—ll of FIG. 1 through the ramp unit of a further brake device having thrust rolling bearings, wherein the rolling elements are balls, the threaded spindle being omitted in this figure.

The only difference between the ramp unit 22 of FIG. 2 and that of FIG. 1 is that the rolling elements of the rolling element set 23, and those of the thrust rolling bearing 24 for the nut flange 13 and the thrust rolling bearing 25 for the drive flange 14 are balls.

The actuating device of the invention functions as follows: The compression spring 21 presses the assembly consisting of the thrust rolling bearings 20, or 24, and 18, or 25, the nut flange 13, the rolling element set 12, or 23, and the drive flange 14 together with an adequate force. The threaded spindle I now operates in the stages $S_1$ and $S_2$ of its stroke. The rotating drive flange 14 transmits the motion imparted to it by the drive motor 9, via the rolling element set 12, or 23, to the nut flange 13. This does not result in any relative displacement between the nut flange 13 and the drive flange 14. Being secured against rotation, the threaded spindle 1 is displaced axially by the nut 2 which rotates together with the nut flange 13.

Figure 3:
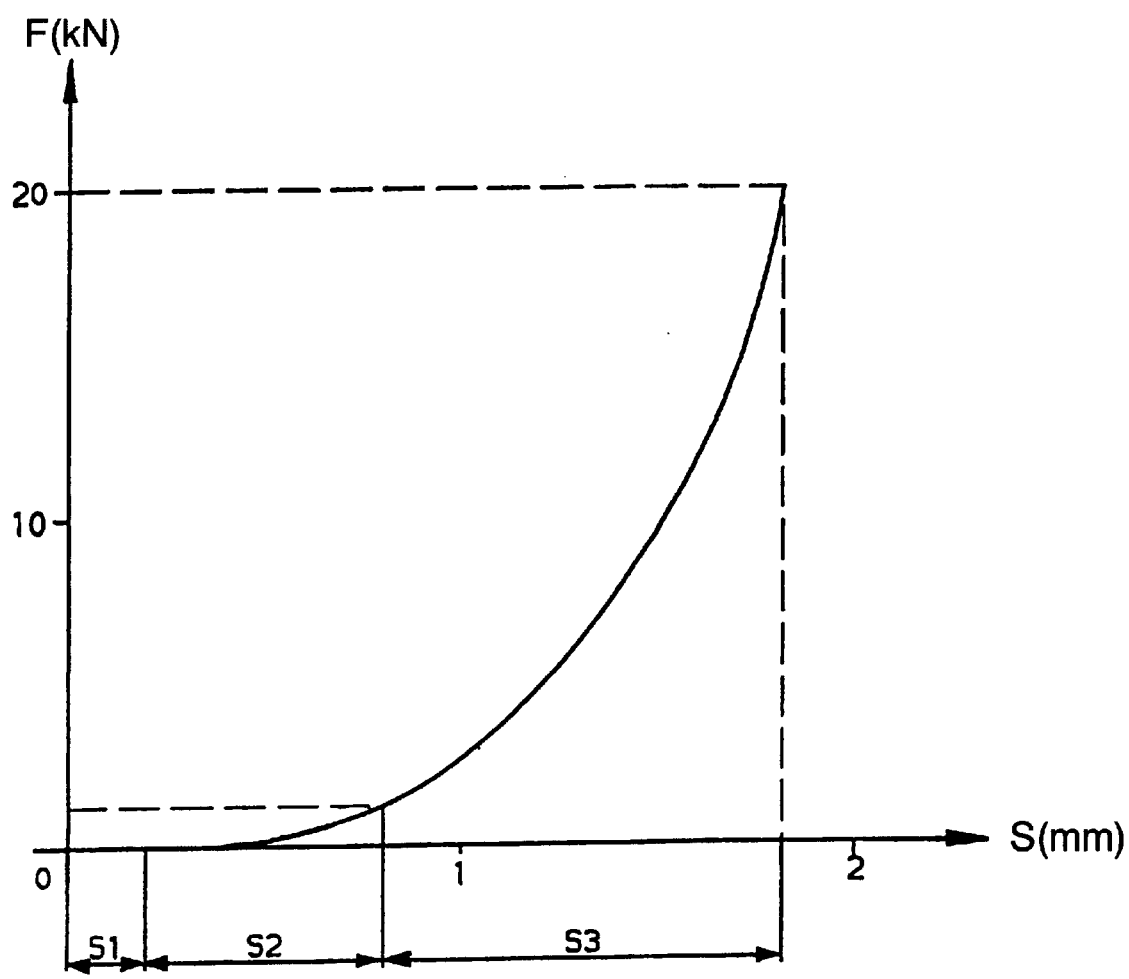
FIG. 3 is a diagram showing the dependence of the required brake force on the stroke of the threaded spindle of an actuating device.

When, upon further movement and execution of its stroke, the threaded spindle 1 reaches the stage $S_3$ of its stroke shown in FIG. 3, in which there is a stronger increase of load, the friction between the threaded spindle 1 and the nut 2 also increases, so that the nut stops rotating relative to the threaded spindle. This is followed by a displacement of the drive flange 14 relative to the nut flange 13 which is now stationary. Due to the presence of the ramps 16 on the nut flange 13 and the drive flange 14, and the rolling elements of the rolling element set 12, or 23, arranged therebetween, the nut flange 13 and the drive flange 14 are spread axially apart. Since the drive flange 14 is supported on the thrust bearing 18, or 25, and cannot change its axial position, an axial movement of the nut flange 13 is caused against the action of the compression spring 21. The nut 2 and the threaded spindle 1 now move together with the nut flange 13, so that due to the rolling motion of the rolling element set 12, or 23, of the threaded spindle 1, a further stroke is executed which effects the braking of the brake disc 6.

At the end of this braking operation, the rolling elements of the rolling element set 12, or 23, are returned to their original position by the force of the compression spring 21. Therefore, due to the action of the compression spring 21, the axial distance L between the outer surfaces of the bearing rings of the thrust rolling bearings 20, or 24, and 18, or 25, is the same after each stroke. Even if, due to a wear of the brake linings, the threaded spindle 1 does not return to its end axial position, the rolling elements of the rolling element set 12, or 23, of the ramp unit 10, or 22, always regain their end position and thus effect an adjustment of the stroke.

Only a relatively small spreading movement of the ramp unit 10, or 22, is required for this adjusting function. The ascending gradient of the ramps is determined by the load take-up required. To assure a definite position of the rolling elements and an increase of the initial friction in the ramp unit so as to enable the nut 2 to rotate relative to the threaded spindle 1 to a defined, desired extent, depressions 17 acting as locks can be arranged in the ramps 16.

It is also possible to reverse the principle of the invention and implement it with a rotationally fixed nut and a rotating spindle.

What is claimed is:

1. A device for actuating a vehicle brake, said device comprising:
    a threaded spindle which is secured against rotation in a stationary housing while being axially displaceable toward and away from a brake disc of the vehicle brakes
    a nut which surrounds the threaded spindle and effects a displacement thereof, said nut having a longitudinal axis and being mounted for rotation about this longitudinal axis in the stationary housing while being connected to a rotor of a drive motor; and
    a motor-transmitting ramp unit equipped with rolling elements is arranged between the nut and the drive motor wherein the ramp unit comprises one rolling element set which surrounds the threaded spindle while being arranged axially between two flange bodies each of which comprises ramps and depressions, one of said flange bodies is configured as a nut flange fixed on the nut and the other of said flange bodies is configured as a drive flange formed on a drive sleeve which is connected to the rotor of the drive motor.

2. A device of claim 1 wherein the nut flange is urged by a compression spring axially toward the rolling element set and the drive flange within the stationary housing.

3. A device of claim 2 wherein the compression spring is a disc spring and has one end which is supported on a step of the stationary housing and another end which is supported on a bearing ring of a thrust rolling bearing for the nut flange.

4. A device of claim 2 wherein a bearing ring of a thrust rolling bearing for the drive flange is supported within the stationary housing on an end rim of the stationary housing.

5. A device of claim 1 wherein the nut is rotatably and slidably supported by a linear ball bearing within the stationary housing.

6. A device of claim 1 wherein the threaded spindle is configured as a sliding spindle and directly surrounded by the nut which has a profile that is complementary to a profile of the threaded spindle.

7. A device of claim 1 wherein at least one of the threaded spindle and the nut has a friction-reducing coating.

8. A device of claim 1 wherein ascending gradients of the ramps of the drive flange and the nut flange are variable in peripheral direction of said flanges.

* * * * *